United States Patent
Kim et al.

(10) Patent No.: US 12,301,707 B2
(45) Date of Patent: May 13, 2025

(54) ELECTRONIC DEVICE USING DIVISION PERMISSION AND OPERATION METHOD THEREOF

(71) Applicant: Samsung Electronics Co., Ltd., Gyeonggi-do (KR)

(72) Inventors: Moonkyung Kim, Gyeonggi-do (KR); Myeongjin Oh, Gyeonggi-do (KR); Seyeong Lee, Gyeonggi-do (KR); Dongwook Seo, Gyeonggi-do (KR); Yeongsu Lee, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 294 days.

(21) Appl. No.: 17/873,573

(22) Filed: Jul. 26, 2022

(65) Prior Publication Data
US 2023/0052759 A1    Feb. 16, 2023

Related U.S. Application Data

(63) Continuation of application No. PCT/KR2022/009184, filed on Jun. 28, 2022.

(30) Foreign Application Priority Data

Aug. 5, 2021    (KR) .......................... 10-2021-0103103

(51) Int. Cl.
*H04L 9/08* (2006.01)
*H04L 9/14* (2006.01)
*H04L 9/32* (2006.01)

(52) U.S. Cl.
CPC .............. *H04L 9/0825* (2013.01); *H04L 9/14* (2013.01); *H04L 9/3247* (2013.01)

(58) Field of Classification Search
CPC ........ H04L 9/0825; H04L 9/14; H04L 9/3247
USPC ....................................... 713/171, 173, 176
See application file for complete search history.

(56) References Cited

U.S. PATENT DOCUMENTS

| 10,686,836 | B1 * | 6/2020 | Stolfo | .................... H04L 63/105 |
| 2016/0044049 | A1 * | 2/2016 | Xing | ........................ H04L 63/14 726/23 |
| 2021/0250339 | A1 * | 8/2021 | Chumura | .................. H04L 9/14 |

FOREIGN PATENT DOCUMENTS

| CN | 106326723 A | 1/2017 |
| CN | 106650322 A | 5/2017 |
| KR | 10-2013-0028438 A | 3/2013 |
| KR | 10-2013-0085504 A | 7/2013 |
| KR | 10-1345959 B1 | 1/2014 |
| KR | 1345959 B1 * | 1/2014 |

(Continued)

*Primary Examiner* — Liang Che A Wang
(74) *Attorney, Agent, or Firm* — Cha & Reiter, LLC

(57) ABSTRACT

An electronic device using a division permission and an operating method thereof are disclosed herein. The electronic device includes a processor or a memory storing at least one instruction executable by the processor, and when the at least one instruction is executed by the processor, the processor receives a request for installing a first application on an electronic device, acquires a division permission information corresponding to a signature permission declared by the first application, applies the division permission information to a database, installs the first application. The division permission information may be used for the signature permission on a second application different from the first application.

9 Claims, 10 Drawing Sheets

(56) References Cited

FOREIGN PATENT DOCUMENTS

| KR | 10-2016-0033510 A | | 3/2016 |
|----|-------------------|---|--------|
| KR | 20160033510 A | * | 3/2016 |
| KR | 10-2016-0097511 A | | 8/2016 |
| KR | 10-2257604 B1 | | 5/2021 |

* cited by examiner

```
<manifest xmlns:android="http://schemas.android.com/apk/res/android
    package="package01"
    android : versionCode="1"
    android : versionName="1">

<permission
        android : name="Permission1"
        android : protectionLevel="signature"
710 ─┤  android : divisionPermission="signature : 123456789" />

<manifest>
```

FIG. 7

ELECTRONIC DEVICE USING DIVISION PERMISSION AND OPERATION METHOD THEREOF

CROSS-REFERENCE TO RELATED APPLICATIONS

This application is a continuation of a national stage application of International Application No. PCT/KR2022/009184 designating the United States, filed on Jun. 28, 2022, in the Korean Intellectual Property Receiving Office and claiming priority to Korean Patent Application No. 10-2021-0103103, filed on Aug. 5, 2021, in the Korean Intellectual Property Office, the disclosures of which are incorporated by reference herein in their entireties.

BACKGROUND

1. Field

One or more embodiments of the present disclosure generally relate to an electronic device using division permission and an operation method thereof.

2. Description of Related Art

An electronic device such as a smartphone or a tablet may include applications that provides various functions or services. The applications may be preloaded in the electronic device or may be downloaded onto the electronic device through a separate application such as an app store. When an application is installed on the electronic device, the permissions of the application may be set using signature keys.

SUMMARY

While various applications are increasingly installed and utilized on electronic devices as technologies for electronic devices such as a smartphone or a tablet are developed, there may be constraints in that the same signature may need to be used for granting permissions of various applications due to security reasons.

According to certain embodiments of the present disclosure, when a first application that declared a signature permission and a second application that desires to use the signature permission are signed with different signing keys, the second application may acquire the signature permission validly by using a division permission.

In addition, according to certain embodiments, as conditions for acquiring the division permission are set based on various information verifiable on an application, the second application meeting the conditions may acquire the signature permission effectively without requiring a signature to be performed on the first application.

According to an example embodiment, an electronic device includes a processor; and a memory storing at least one instruction executable by the processor, and when the at least one instruction is executed by the processor, the processor receives a request for installing the first application on an electronic device, acquires information of the division permission corresponding to the signature permission declared on the first application, applies the division permission information to a database, and installs the first application, and the division permission information may be used for the signature permission on the second application different from the first application.

According to an example embodiment, an electronic device includes a processor; and a memory storing at least one instruction executable by the processor, and when the at least one instruction is executed by the processor, the processor receives a request for installing the second application that requires use of a signature permission declared on the first application, and checks whether division permission information corresponding to the signature permission exists in a database, installs the second application without acquiring the signature permission in response to when the division permission information does not exist in the database, determines whether the second application meets the acquisition conditions set on the division permission information in response to when the division permission exists in the database, and grants the signature permission to the second application and installs the second application in response to when the second application meets the acquisition conditions.

According to an example embodiment, a method of operating an electronic device may include an operation of receiving a request to install a first application on the electronic device, an operation of acquiring division permission information corresponding to a signature permission declared on the first application, an operation of applying the division permission information to a database and an operation of installing the first application. The division permission information may be set to use the signature permission on the second application to different from the first application.

According to an example embodiment, a method of operating an electronic device may include an operation of receiving a request for installing a second application that requires use of a signature permission declared by a first application on the electronic device, an operation of checking whether division permission information corresponding to the signature permission exists in a database, and an operation of installing the second application without acquiring the signature permission in response to when the division permission information does not exist in the database, an operation of determining whether the second application meets an acquisition condition set in the division permission information, and an operation of granting the signature permission to the second application and installing the second application in response to when the second application meets the acquisition condition.

According to certain embodiments, a division permission may be acquired without a signature permission declared by a third party when the condition for acquiring the division permission is met, thereby effectively shortening the time for developing an application.

In addition, according to certain embodiments, by setting a division permission, an application under development for acquiring a signature permission declared by a third party may be delivered to the third party without requiring a signature of the third party, thereby allowing more efficient and effective collaboration.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram illustrating acquisition conditions for a division permission according to an example embodiment;

DETAILED DESCRIPTION

Figure 1:
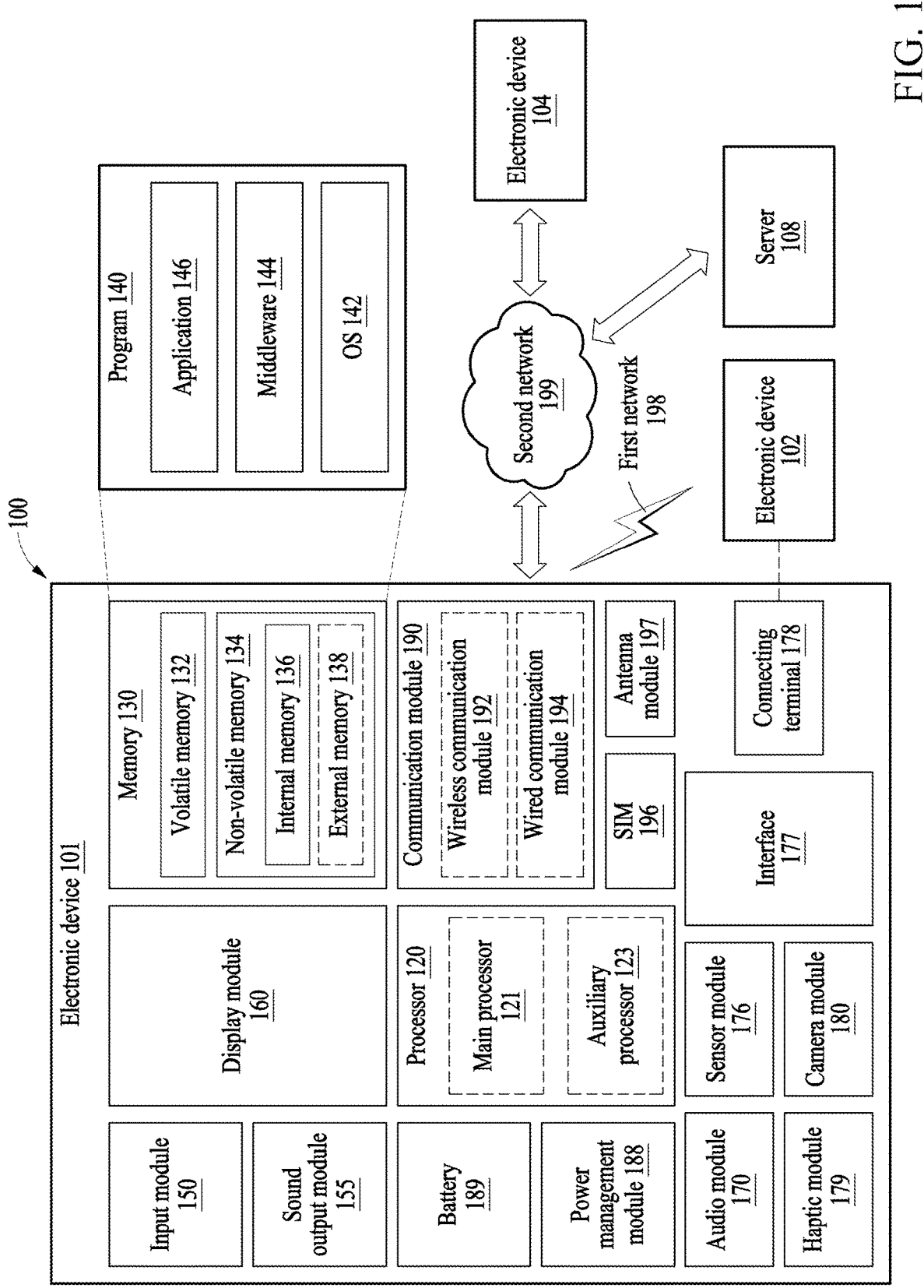
FIG. 1 is a block diagram illustrating an example electronic device in a network environment according to an example embodiment.

Hereinafter, example embodiments will be described in detail with reference to the accompanying drawings. When describing the example embodiments with reference to the accompanying drawings, like reference numerals refer to like elements and any repeated description related thereto will be omitted.

FIG. 1 is a block diagram illustrating an electronic device in a network environment according to an example embodiment.

FIG. 1 is a block diagram illustrating an electronic device 101 in a network environment 100 according to an example embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. For example, the auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa.

According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the set communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to an example embodiment, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
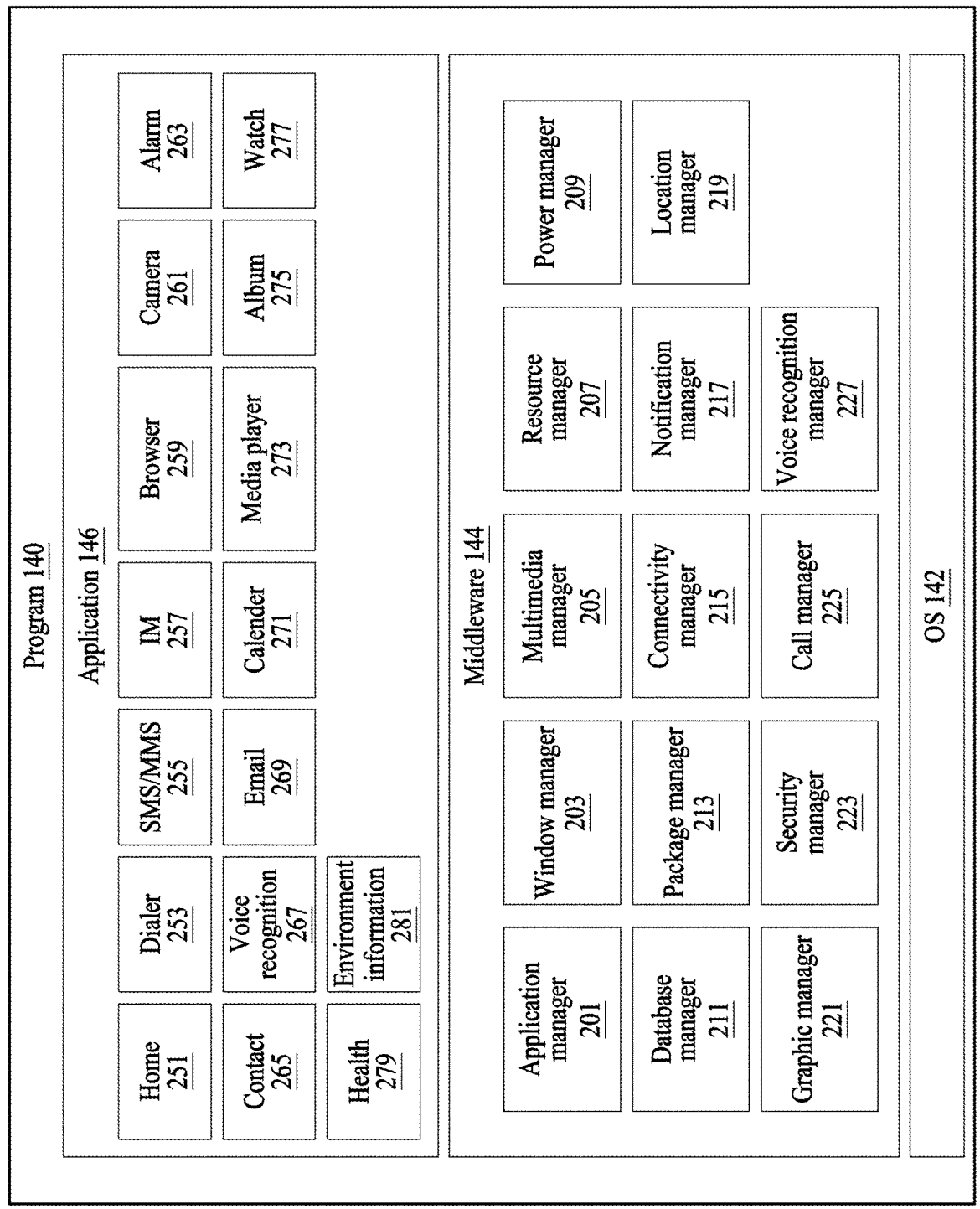
FIG. 2 is a block diagram illustrating an example program according to an example embodiment.

FIG. 2 is a block diagram 200 illustrating an example program 140 according to an example embodiment. According to an example embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects. The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to an example embodiment, the middleware 144 may dynamically delete some existing components or add new components. According to an example embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support installation, deletion, or update of an application that operates in an external electronic device.

The electronic device according to certain example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that certain example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-predetermined integrated circuit (ASIC).

Certain example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to certain example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to certain example embodiments, each component (e.g., a module or a program) of the above-described components may include a single entity or multiple entities, and some of the multiple entities may be separately disposed in different components. According to certain example embodiments, one or more of the above-described components may be omitted, or one or more other components may be added. Alternatively or additionally, a plurality of components (e.g., modules or programs) may be integrated into a single component. In such a case, according to certain example embodiments, the integrated component may still perform one or more functions of each of the plurality of components in the same or similar manner as they are performed by a corresponding one of the plurality of components before the integration. According to certain example embodiments, operations performed by the module, the program, or another component may be carried out sequentially, in parallel, repeatedly, or heuristically, or one or more of the operations may be executed in a different order or omitted, or one or more other operations may be added.

Figure 3:
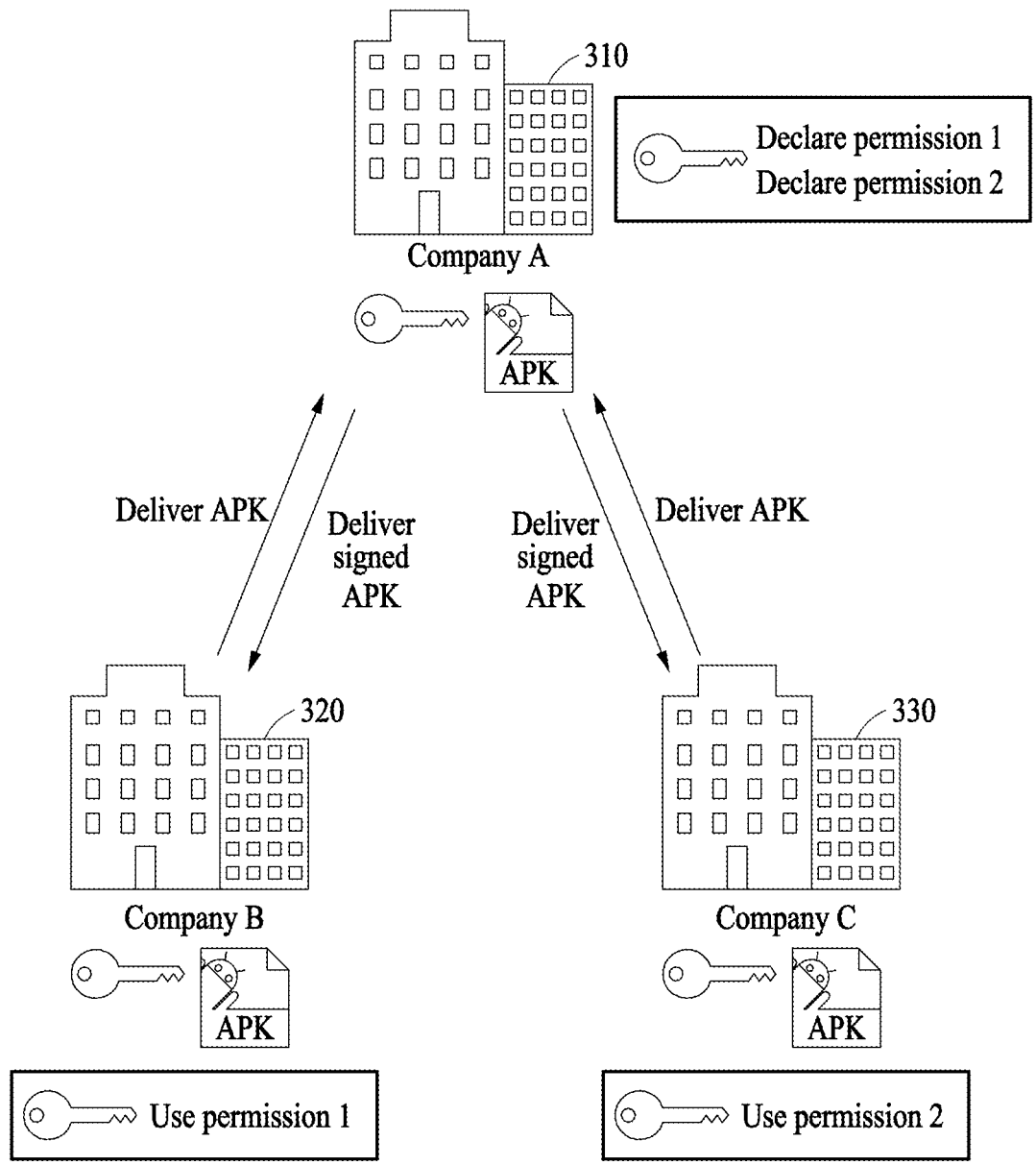
FIGS. 3 and 4 are diagrams illustrating an acquisition of a signature permission based on collaboration according to an example embodiment.
Figure 4:

FIG. 3 and FIG. 4 are diagrams illustrating an acquisition of a signature permission based on collaboration according to an example embodiment.

FIG. 3 illustrates an example of a situation in which a company B 320 and a company C 330 require a signature permission of a company A 310. Although the companies A 310, B 320, and C 330 are provided as examples for the convenience of description, examples are not limited thereto and the following description may also be applicable to situations where multiple development entities require multiple different signature keys, for example.

In general, when an application is installed on the Android platform, a permission that may be used in accordance with a particular condition may be acquired by application. For example, to acquire a signature permission from an application, a signature of an application declaring the signature permission and a signature of an application using the signature permission may need to be the same. For example, when a first application declares a signature permission defined by a second application and the first application and the second application are signed with the same certificate, the signature permission may be granted to the first application at the time of installation in an Android-based system. Otherwise, the signature permission may not be granted to the first application.

As this way of implementing signature permission has a relatively high level of protection, it may be used for permissions related to key functions that may not be accessed by everyone. A private key used for the signature may be stored in a location of the memory having high security, thereby denying unauthorized access. For example, the signature permission may be required for restricted data (e.g., system status, contact information, biometric information of a user, financial information, and photos) and/or restricted actions (e.g., connection to a paired device, audio recording, photo taking, fingerprint recognition, iris recognition, face recognition, and payment). Many companies may build their applications by setting their key functions based on the signature permission and a shared UID. The shared UID will be described in detail with reference to FIG. 8.

In such an environment, when company B 320 working on an application project collaboration intends to use permission 1 declared by company A 310, in accordance with the aforementioned constraints, it may be required for company B 320 to deliver an Android application package (APK) of the application developed by the company B 320 to company A 310 to be signed and delivered back to the company B 320. As these operations are required whenever company B 320 needs to check if the application it is developing is working properly, this development paradigm is cumbersome and time-consuming. In addition, even though the application is developed by company B 320, the application may not be included in the application ecosystem built by company B 320 as the application requires the signature of company A 310, even though company B may bear the risk of delivering the developed application to end users. This may be equally applied to company C 330 developing an application using permission 2 declared by the company A 310.

Referring to FIG. 4, the acquisition of a signature permission during collaboration may be simplified by using a division permission. Company A may develop an application A and declare signature-level permissions 1 and 2, and may not have a shared UID. Company B may want to use the permission 1 on a developed application B, and its shared UID may be bbb. Company C may desire to use the permission 2 on a developed application C, and its shared UID may be ccc.

In operation 410, an electronic device of company A may add division permission information related to an acquisition condition of the declared signature permission. For example, the electronic device may set the acquisition condition of the permission 1 as a signature based on the signature key B, and set the acquisition condition of the permission 2 as the UID being ccc. For example, a signature key may include a private key.

In operation 420, the electronic device of company A may deliver the division permission information of the permission 1 to an electronic device of company B. In addition, to the electronic device of company A may deliver the division permission information of the permission 2 to an electronic device of company C.

In operation 430, the electronic device of the company B may deliver an application to company A using the received division permission information and add the permission 1 to application B without acquiring a signature from company A. For example, as the acquisition condition for the permission 1 corresponds to the signature key being B, the application B signed with the signature key B may acquire the permission 1 validly. Application B, which is capable of acquiring the permission 1 without the signature directly from company A, may be distributed after development.

In operation 440, the electronic device of company C may use the received division permission information to deliver application C to company A and add the permission 2 to application C without acquiring the signature of company A. For example, as the acquisition condition for the permission 2 corresponds to the shared UID being ccc, application C for which the shared UID is set as ccc may acquire the permission 2 validly. Application C, which is capable of acquiring the permission 2 without the signature directly from company A, may be distributed after development.

Thus, the permission 1 and the permission 2 may be acquired without direct signature of company A as long as the permission 1 and the permission 2 meet the respective acquisition conditions. Then as described above, the hassle of requiring a signature from company A whenever operations of application developed by companies B and C need to be checked may be avoided. In addition, the applications may be distributed after development, thus the time required for development may be effectively reduced. The acquisition condition may include signature information, a package name, a shared UID of the application permitted to use the signature permission or a combination thereof, but example embodiments are not limited thereto, and the acquisition condition may be set as various information included in the application without limitation.

Hereinafter, the division permission will be described in detail with reference to the accompanying drawings.

Figure 5:
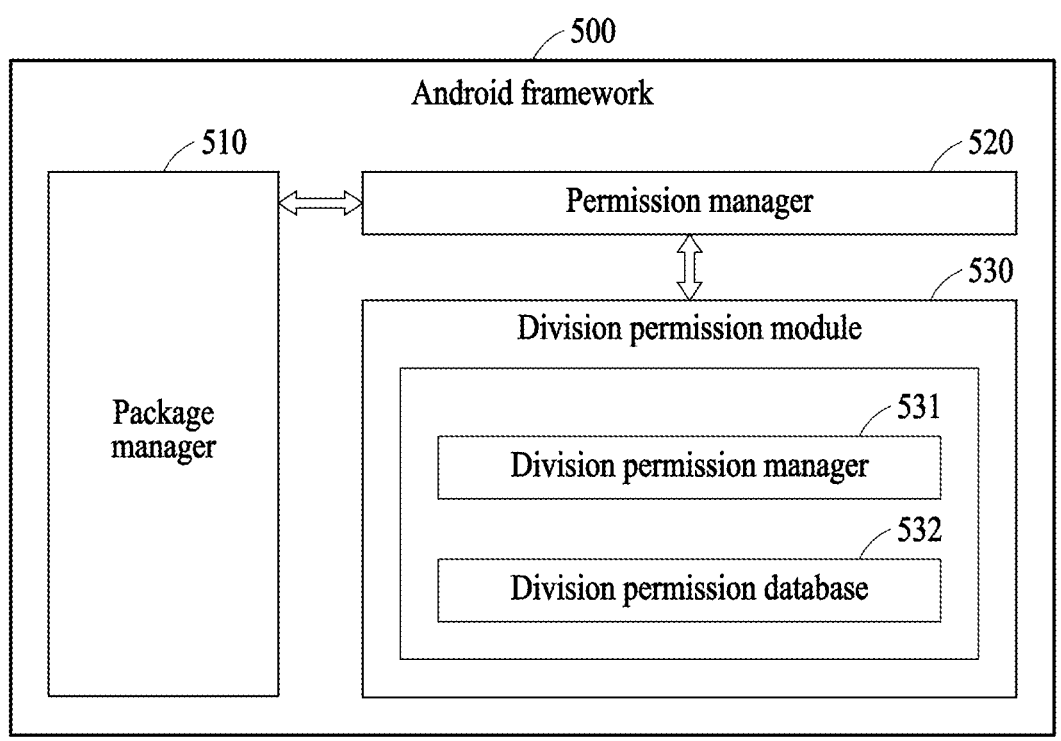
FIG. 5 is a diagram illustrating an Android framework according to an example embodiment.

FIG. 5 is a diagram illustrating an Android framework according to an example embodiment.

Referring to FIG. 5, an Android framework 500 of an electronic device (e.g. smartphone) may include a package manager 510 (e.g., the package manager 213 of FIG. 2), a permission manager 520, and a division permission module 530.

The package manager 510 may register or remove application information when an application is installed or deleted on the electronic device. The application information may include signature information, a UID, and an available permission for each package name on the electronic device. However, the application information is not limited thereto, and the description herein may be applied to other application information.

The permission manager 520 may be an Android module that performs processing of the permissions in the application information. The permission manager 520 may extract a list of permissions to be declared or used when the application is installed, and may operate to acquire permissions meeting certain conditions for each application.

The division permission module 530 may be a module for processing the division permission described above, and may include a division permission manager 531 and a division permission database 532.

The division permission manager 531 may check whether an item declared as the division permission exists in the APK of an application when the application is installed. When there is such an item, the division permission manager 531 may store the permission in the division permission database 532. The division permission manager 531 may check whether the permission the application to be installed intends to use exists in the division permission database 532. When the permission exists in the division permission database 532, the division permission manager 531 may check the acquisition condition of the permission to process the acquisition of the permission when the application meets the condition.

The division permission database 532 may store division permission information of the application installed on the electronic device. The division permission database 532 may map a permission and an acquisition condition of the permission and store the result of the mapping. The acquisition condition may include signature information, a package name, a shared UID of an application permitted to use a signature permission, or a combination thereof. However, the acquisition conditions are not limited thereto, and other acquisition conditions may also be applied.

An example of the division permission information stored in the division permission database 532 may be as follows.

TABLE 1

| Permission Name | Condition | Value |
|---|---|---|
| Permission01 | Signature | 123456 |
| Permission02 | Shared UID | 123 |
| Permission03 | Signature PackageName | 222222 com.android.example01 |

For example, the acquisition condition for permission 1 corresponds to a signature signed with a signature key having a value of '123456,' the acquisition condition for permission 2 corresponds to a shared UID being '123', and the acquisition condition for permission 3 corresponds to a signature signed with a signature key having a value of '222222,' and the package name being 'com.android.example01.'

Figure 6:
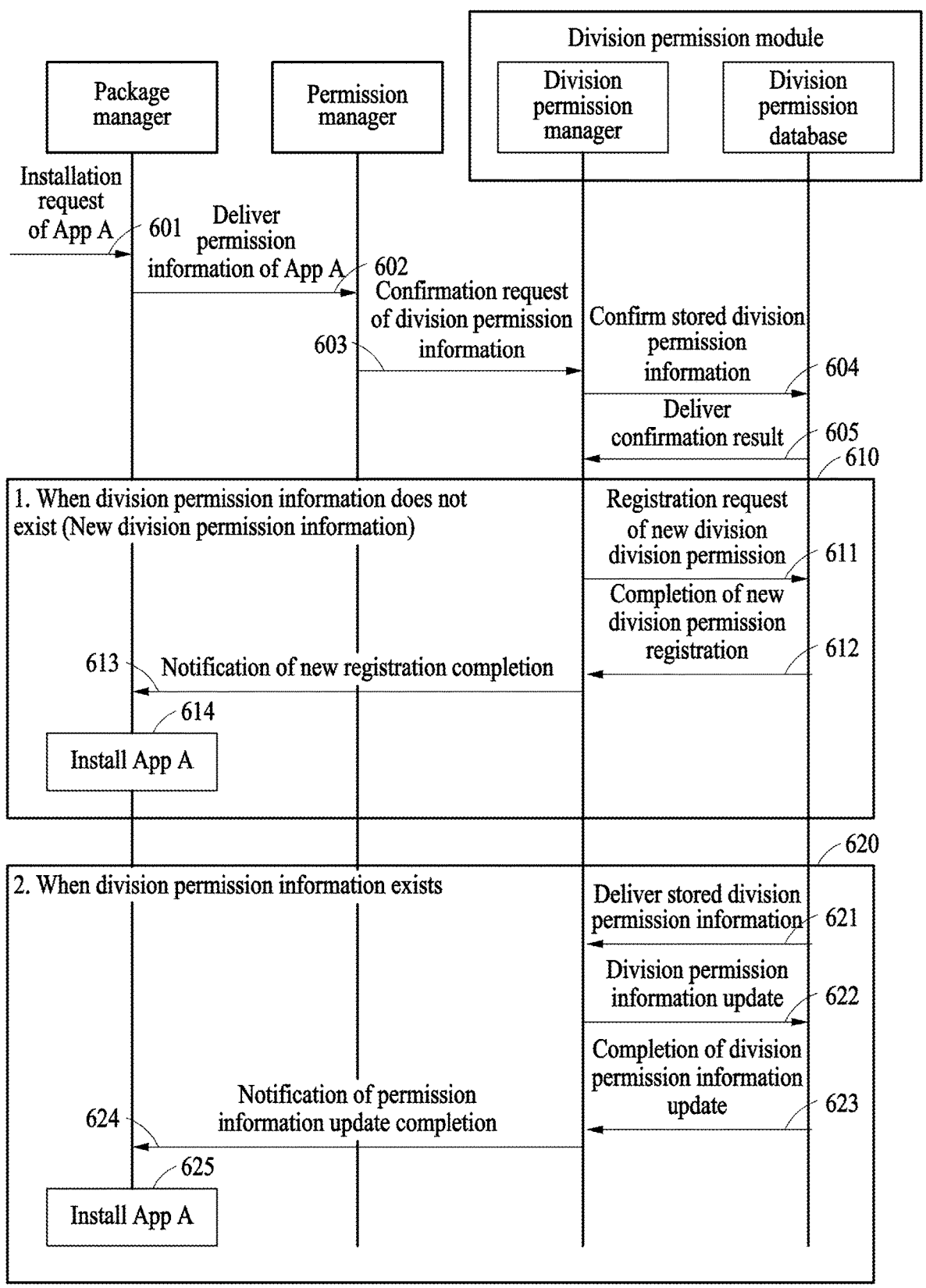
FIG. 6 is a diagram illustrating an operation of registering a division permission according to an example embodiment.

FIG. 6 is a diagram illustrating an operation of registering a division permission according to an example embodiment.

In the following examples, operations may be performed in the sequence as shown or not. For example, the order of the operations may be changed and at least two of the operations may be performed in parallel. Operations 601 through 625 may be performed by at least one component (e.g., the processor 120 of FIG. 1) of an electronic device (e.g., the electronic device 101 of FIG. 1). The electronic device may be a terminal of company A registering division permission information as described in the example of FIG. 4, and a package manager illustrated in FIG. 6 (e.g., the package manager 213 of FIG. 2 and the package manager 510 of FIG. 5), a permission manager (e.g., the permission manager 520 of FIG. 5), and a division permission module (e.g., the division permission module 530 of FIG. 5) may be included in the electronic device.

In operation 601, the package manager may receive an installation request for an application A.

In operation 602, the package manager may extract permission information of the application A and deliver the permission information to the permission manager.

In the operation 603, the permission manager may receive the permission information included in the application A from the package manager and request a division permission manager (e.g., the division permission manager 531 of FIG. 5) to confirm the division permission information. Although the requester of the confirmation request for the division permission information is illustrated in FIG. 6 as the permission manager for the convenience of description, the package manager may directly request the confirmation of the division permission information based on the structures of the Android framework (e.g., the Android framework 500 of FIG. 5).

In operation 604, the division permission manager may check whether the division permission information is stored in a division permission database (e.g., the division permission database 532 of FIG. 5) in response to the confirmation request. The division permission information may include information on a signature permission which is a target of the division permission and an acquisition condition thereof.

In operation 605, a confirmation result may be delivered from the division permission database to the division permission manager. For example, when it is confirmed that there is the division permission database does not contain the division permission information in question, operation 610 may be performed subsequently. On the other hand, when it is confirmed that there is division permission information is present in the division permission database, operation 620 may be performed subsequently.

Operation 610 may be executed to register new division permission information for which the confirmation request is made as the division permission database does not have this division permission information. In operation 611, the division permission manager may request the new registration of the division permission information in the division permission database. In operation 612, a notification indicating that the new registration of the division permission information is completed may be delivered from the division permission database to the division permission manager. In operation 613, the division permission manager may deliver the notification of the completion of the new registration to the package manager. In operation 614, the package manager may install the application A in the electronic device.

Operation 620 may be executed to update the division permission information when there is division permission information in the division permission database. In operation 621, the division permission information previously stored in the division permission database may be delivered to the division permission manager. In operation 622, the division permission manager may request the division permission database to update the division permission information for the application A for which the installation request is made. In operation 623, when the division permission information is updated in the division permission database, a notification of the update may be delivered to the division permission manager. In operation 624, the division permission manager may deliver the notification indicating the completion of the update of the division permission information to the package manager. In operation 625, the package manager may install the application A in the electronic device.

According to an example embodiment, a method of operating an electronic device may include receiving a request for installing a first application on the electronic device, acquiring division permission information corresponding to a signature permission declared by the first application, applying the division permission information to a database, and installing the first application. The division permission information may be set to use the signature permission on a second application different from the first application.

The first application and the second application may be applications signed with different signature keys.

The division permission information may include an acquisition condition for the signature permission declared by the first application.

The acquisition condition may include signature information, a package name, and/or a shared UID of the second application permitted to use the signature permission.

According to an example embodiment, a method of operating an electronic device may include checking whether division permission information is stored in a database, storing the division permission information in the database in response to the division permission information not being stored in the database, and updating the division permission information in response to the division permission information being stored in the database.

FIG. 7 is a diagram illustrating an acquisition condition of a division permission according to an example embodiment.

Referring to FIG. 7, illustrated is a file 'manifest.xml' to which an acquisition condition for a division permission is added. In the file 'manifest.xml' illustrated in FIG. 7, a package name is "package01" that may be used to identify an application package on an electronic device (e.g., the electronic device 101 of FIG. 1). An Android version code and an Android version name each may indicate the version of the file 'manifest.xml' and may be "1" in the example of FIG. 7. A permission may be defined at the bottom of the file 'manifest.xml,' the name of the permission may be set to "Permission1," and the protection level of the permission may be 'signature permission.' In addition, the permission may be set as the division permission, and the acquisition condition of the division permission may include a signature key having a value of '123456789.' However, the acquisition condition 710 is not limited to the foregoing, and various information included in the application such as a package name and/or a shared UID may be applied without limitation.

Figure 8:
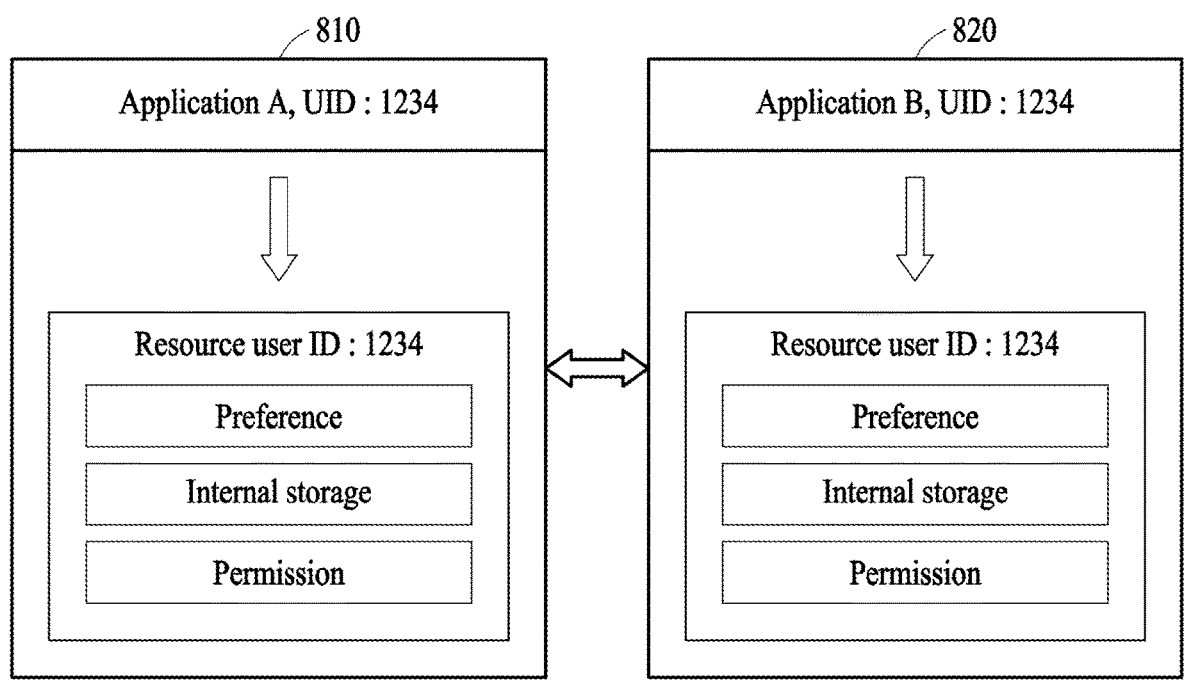
FIG. 8 is a diagram illustrating a shared user identifier (UID) according to an example embodiment.

FIG. 8 is a diagram illustrating a shared UID according to an example embodiment. Referring to FIG. 8, illustrated are an application A 810 and an application B 820 for which a shared UID is used as an acquisition condition for a division permission.

At the installation of an Android application, a unique ID value may be generated based on a package in the application installation file. The unique ID value may also be referred to herein as a UID. A permission to access an internal resource or a storage space of the electronic device may be determined according to the UID value.

In addition, Android may provide a shared UID concept. Using the shared UID concept, multiple applications may share and use a single UID. For example, the same value may be set using a tag 'android:SharedUserId' in a file 'AndroidManifest' of each of two or more different applications that are related to one another, and the corresponding applications may share and use a single UID and use the same signature key for application signature.

As illustrated in FIG. 8, when two or more applications use the same UID '1234,' all UIDs assigned to the electronic device may be the same—'1234,' and the shared UID may enable all applications on the electronic device to access to the same resource or storage space and permission inheritance. As the applications use the same UID '1234,' all resource UIDs of the applications may be the same—'1234.' The resource UID described herein may refer to identification information of data that is included or used by a corresponding application. A preference included in the resource UID may indicate a setting value and/or option value applicable to the application, and an internal storage may indicate a storage space in which the application is stored or used by the application. A permission may indicate a permission that may be used by the application.

For example, when an application A 810 and an application B 820 use the same shared UID, the application B 820 may directly use a permission acquired by the application A 810 even though the application B 820 does not directly acquire the permission acquired by the application A 810.

Figure 9:
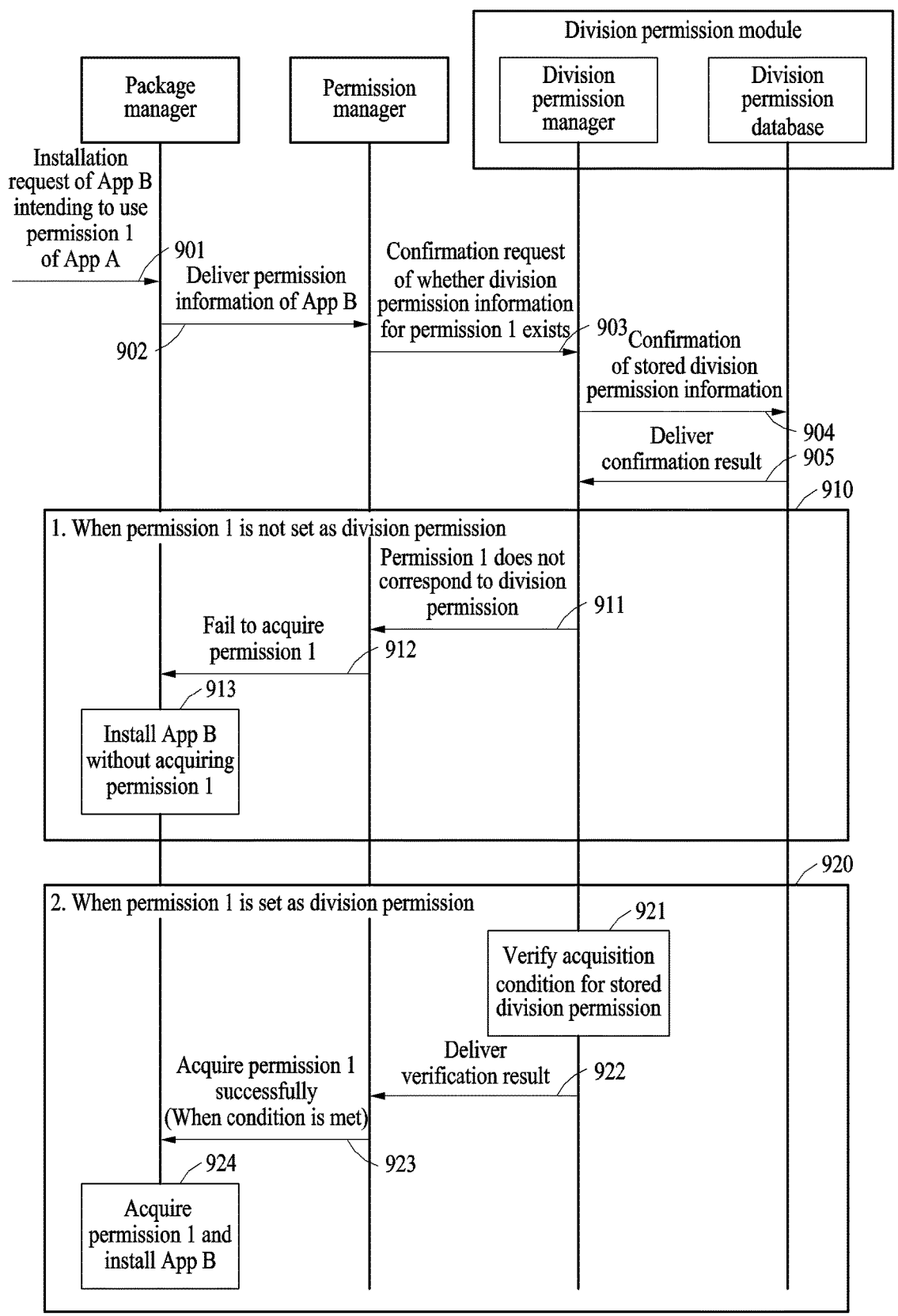
FIG. 9 is a diagram illustrating an operation of using a division permission according to an example embodiment.

FIG. 9 is a diagram illustrating an operation of using a division permission according to an example embodiment.

In the following examples, operations may be performed in the sequence as shown or not. For example, the order of the operations may be changed and at least two of the operations may be performed in parallel. Operations 901 through 924 may be performed by at least one component (e.g., the processor 120 of FIG. 1) of an electronic device (e.g., the electronic device 101 of FIG. 1). The electronic device may be a terminal of company B or C using division permission information as described above with reference to FIG. 4, and a package manager illustrated in FIG. 9 (e.g., the package manager 213 of FIG. 2 and the package manager 510 of FIG. 5), a permission manager (e.g., the permission manager 520 of FIG. 5), and a division permission module (e.g., the division permission module 530 of FIG. 5) may be included in the electronic device.

In the operation 901, the package manager may receive an installation request for an application B that intends to use permission 1 of an application A. The application A and the application B may be applications signed with different signature keys. In an Android system, for application B to use the signature permission of the application A, the application B may also need to be signed with the same signature key as the application A. However, using division signature described above, the application B signed with a different signature key may also validly acquire the signature permission of the application A. For example, application A may be signed with the signature key of company A registering division permission information and application B may be signed with a signature key of company B or C using the division permission information, as described above with reference to FIG. 4.

In operation 902, the package manager may deliver permission information of application B to the permission manager. The permission information may include information indicating that the permission 1 declared by company A is to be used.

In an operation 903, the permission manager may request the division permission manager (e.g., the division permission manager 531 of FIG. 5) to check whether the division permission information for the permission 1 desired by the application B exists. For example, the permission manager may check whether there is a permission not declared by application B in the permissions application B has declared that it intends to use. In this example, when there is a permission declared by another application, the permission manager may request to check whether the division permission information for the permission exists.

In operation 904, the division permission manager may check whether there is division permission information of the permission 1 in a division permission database (e.g., the division permission database 532 of FIG. 5) according to the request for the checking.

In operation 905, the result of the checking may be delivered from the division permission database to the division permission manager. For example, when it is confirmed that there is no division permission information of the permission 1 in the division permission database, the operation 910 may be performed subsequently. On the other hand, when it is confirmed that there is division permission information of the permission 1 in the division permission database, the operation 920 may be performed subsequently.

Operation 910 may be performed when the permission 1 is not set as the division permission in the division permission database. For example, in operation 911, the division permission manager may deliver, to the division manager, information indicating that the permission 1 does not correspond to the division permission information. In operation 912, the division permission manager may deliver, to the package manager, information indicating failure of acquisition of the permission 1 of the application B because the permission 1 does not correspond to the division permission and the signature key of the application A declaring the permission 1 and the signature key of the application B, which intends to use the permission 1, are different. In operation 913, the package manager may install application B on the electronic device without acquiring the permission 1.

Operation 920 may be performed when the permission 1 is stored in the division permission database as corresponding to the division permission. For example, in operation 921, the division permission manager may verify that the application B has met the condition for acquiring division permission information stored in the division permission database. This acquisition condition may include one or more of signature information, package name, and shared UID information of an application permitted to use the signature permission. However, the acquisition condition is not limited thereto, and various information included in an application may be applied without limitation. In operation 922, the division permission manager may deliver the result of verifying the application B to the permission manager. In operation 923, when it is verified that the application B meets the acquisition condition based on the verification result, the permission manager may notify the package manager that the application B acquired the permission 1 successfully. In operation 924, the package manager may grant the permission 1 to the application B and install the application B on the electronic device. When it is verified that the application B does not meet the acquisition condition based on the verification result, the permission manager may notify the package manager of the result, and the package manager may install the application B on the electronic device without acquiring the permission 1.

According to an example embodiment of the present disclosure, a method of operating an electronic device may include receiving a request for installing, on the electronic device, a second application requiring use of a signature permission declared by a first application, checking whether division permission information corresponding to the signature permission exists in a database, installing the second application without acquiring the signature permission in response to the absence of the division permission information in the database, determining whether the second application meets an acquisition condition set in the division permission information in response to the presence of the division permission information in the database, and granting the signature permission to the second application and installing the second application in response to the second application meeting the acquisition condition.

The method of operating an electronic device may further include installing the second application without acquiring the signature permission in response to the second application not meeting the acquisition condition.

Figure 10:
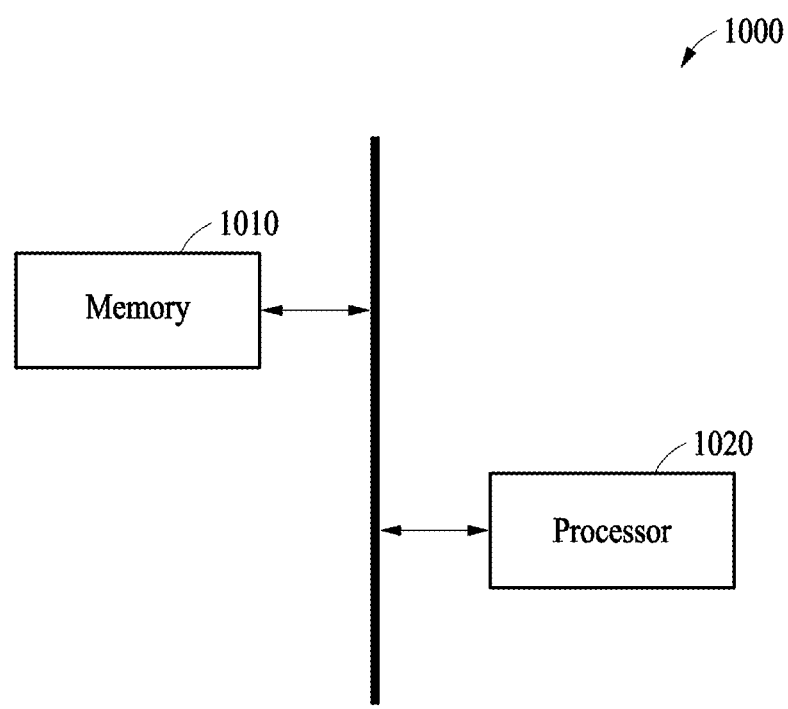
FIG. 10 is a diagram illustrating an electronic device according to an example embodiment.

FIG. 10 is a diagram illustrating an electronic device according to an example embodiment.

Referring to FIG. 10, an electronic device 1000 (e.g., the electronic device 101 of FIG. 1) may include a memory 1010 (e.g., the memory 130 of FIG. 1) and a processor 1020 (e.g., the processor 120 of FIG. 1).

The memory 1010 may include computer-readable instructions. The processor 1020 may perform the operations described above when the instructions stored in the memory 1010 are executed by the processor 1020. The memory 1010 may be a volatile memory or a non-volatile memory. A processor 1020 may be a device executing instructions or programs or controlling the electronic device 1000. The processor 1020 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

The electronic device 1000 may be implemented as a user terminal. The user terminal may include, for example, various computing devices (e.g., a mobile phone, a smartphone, a laptop, a personal computer (PC), a tablet PC, an e-book device, etc.), various wearable devices (e.g., a smartwatch, smart eyeglasses, a head-mounted display (HMD), smart clothing, etc.), various home appliances (e.g., a smart speaker, a smart TV, a smart refrigerator, etc.), and other devices such as a smart vehicle, a smart kiosk, an Internet of Things (IoT) device, a walking assist device (WAD), a drone, a robot, and the like.

The electronic device 1000 may receive a request for installing a first application on the electronic device 1000, acquire division permission information corresponding to a signature permission declared by the first application, apply the division permission information to a database, and install the first application. Alternatively, the electronic device 1000 may receive a request for installing, on the electronic device 1000, a second application that intends to use a signature permission declared by the first application, check whether division permission information corresponding to the signature permission exists in a database, install the second application without acquiring the signature permission when the division permission information does not exist in the database, determine whether the second application meets an acquisition condition set in the division permission information when the division permission information exists in the database, and grant the signature permission to the second application and install the second application when the second application meets the acquisition condition.

The electronic device 1000 may perform the other operations described above.

According to an example embodiment, the electronic device 1000 may include the processor 1020 and the memory 1010 including at least one instruction executable by the processor 1020. When the at least one instruction is executed by the processor 1020, the processor 1020 may receive a request for installing a first application on the electronic device 1000, acquire division permission information corresponding to a signature permission declared by the first application, apply the division permission information to a database, and install the first application. The division permission information may be set to use the signature permission on the second application different from the first application.

The first application and the second application may be applications signed with different signature keys.

The division permission information may include an acquisition condition for the signature permission declared by the first application.

The acquisition condition may include signature information, a package name, and/or a shared UID of the second application permitted to use the signature permission. The processor 1020 of the electronic device 1000 may check whether the division permission information is stored in the database, store the division permission information in the database when the division permission information is not stored in the database, and update the division permission information when the division permission information is stored in the database.

According to an example embodiment, the electronic device 1000 may include the processor 1020 and the memory 1010 including at least one instruction executable by the processor 1020. When the at least one instruction is executed by the processor 1020, the processor 1020 receives a request for installing the second application requiring use of a signature permission declared by the first application on the electronic device, checks whether division permission information corresponding to the signature permission exists in the database, installs the second application without acquiring the signature permission in response to when the division permission information does not exist in the database, determines whether the second applications meets the acquisition condition set in the division permission information in response to when the division permission information exists in the database, and grant and install the signature permission to the second application in response to when the second application meets the acquisition condition.

According to an example embodiment, on the electronic device 1000, the processor 1020 may install the second application without acquiring the signature permission in response to when the second application does not meet the acquisition condition.

According to an example embodiment, the division permission information on the electronic device 1000 may be set to use the signature permission on the second application different from the first application.

According to an example embodiment, on the electronic device 1000, the first application and the second application may be applications signed with different signature keys.

According to an example embodiment, the acquisition condition on the electronic device 1000 may include signature information, a package name, and/or shared user UID information of the application permitted to use the signature information.

According to an example embodiment, on the electronic device 1000, the processor 1020 may check whether there is a permission not declared by the second application in the permissions to be used by the second application.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The example embodiments of the present disclosure disclosed in the specification and the drawings are presented to describe technical details of various example embodiments set forth herein easily and help their understanding, and are not to limit the scope of the various example embodiments thereto. Therefore, all changes or modifications derived from the technical ideas of the various example embodiments of the present disclosure as well as the various example embodiments disclosed herein may be construed to fall within scope of the various example embodiments.

What is claimed is:

1. An electronic device comprising:
a processor; and
a memory storing at least one instruction executable by the processor,
wherein when the at least one instruction is executed by the processor, the processor is configured to:
receive a request for installing a first application on the electronic device;
acquire division permission information corresponding to a signature permission declared by the first application;
apply the division permission information to a database; and
install the first application,
wherein the division permission information is used for the signature permission on a second application different from the first application, and
wherein the second application has the same signature information, package name, or shared UID as the first application.

2. The electronic device of claim 1, wherein the first application and the second application are applications signed with different signature keys.

3. The electronic device of claim 1, wherein the division permission information further comprises an acquisition condition for the signature permission declared by the first application.

4. The electronic device of claim 1, wherein when the at least one instruction is executed by the processor, the processor is configured to:
check whether the division permission information is stored in the database;
store the division permission information in the database when the division permission information is absent in the database; and
update the division permission information when the division permission information is stored in the database.

5. A method of operating an electronic device, the method comprising:
receiving a request for installing a first application on the electronic device;
acquiring division permission information corresponding to a signature permission declared by the first application;
applying the division permission information to a database; and
installing the first application,
wherein the division permission information is set to use the signature permission on a second application different from the first application, and
wherein the second application has the same signature information, package name, or shared UID as the first application.

6. The method of claim 5, wherein the first application and the second application are applications signed with different signature keys.

7. The method of claim 5, wherein the division permission information further comprises an acquisition condition for the signature permission declared by the first application.

8. The method of claim 5, further comprising:
checking whether the division permission information is stored in the database;
storing the division permission information in the database when the division permission information is absent in the database; and
updating the division permission information when the division permission information is stored in the database.

9. A non-transitory computer-readable storage medium where programs for executing the method of claim 5 are recorded.

* * * * *